US006560358B1

(12) United States Patent
Tsukada

(10) Patent No.: US 6,560,358 B1
(45) Date of Patent: May 6, 2003

(54) COLOR MATCHING METHOD, COLOR MATCHING APPARATUS AND MEDIUM HAVING A MACHINE-READABLE PRODUCT

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/411,829

(22) Filed: Oct. 4, 1999

(30) Foreign Application Priority Data

Oct. 9, 1998 (JP) .......................................... 10-287404

(51) Int. Cl.[7] ................................................. G06K 9/00
(52) U.S. Cl. .......................... 382/167; 358/1.9; 358/518
(58) Field of Search ........................ 382/162, 166–167, 382/300–301; 358/500, 501, 529, 516, 518, 296, 520, 1.9, 525; 345/589, 593, 597–605, 606; 348/655

(56) References Cited

U.S. PATENT DOCUMENTS

| 5,590,251 | A | * | 12/1996 | Takagi | 345/604 |
| 5,687,000 | A | * | 11/1997 | Nakaoka | 358/296 |
| 5,754,682 | A | | 5/1998 | Katoh | 382/162 |
| 5,774,238 | A | | 6/1998 | Tsukada | 358/529 |
| 5,920,358 | A | | 7/1999 | Takemura | 348/655 |
| 6,118,455 | A | * | 9/2000 | Hidaka et al. | 345/589 |
| 6,414,756 | B1 | * | 7/2002 | Tsukada | 358/1.9 |

FOREIGN PATENT DOCUMENTS

| EP | 669 754 | 8/1995 | ............ H04N/1/60 |
| EP | 753 725 | 1/1997 | ............ G01J/3/46 |
| EP | 767 445 | 4/1997 | ............ G06T/11/00 |
| JP | 6-22124 | 1/1994 | ............ H04N/1/40 |
| JP | 7-288706 | 10/1995 | ............ H04N/1/60 |
| JP | 10-215385 | 8/1998 | ............ H04N/1/60 |
| JP | 10-229499 | * 8/1998 | ............ H04N/1/46 |
| WO | 92/17982 | 10/1992 | ............ H04N/1/46 |

OTHER PUBLICATIONS

Article—"Praticle Method for Appearance Match Between Soft Copy and Hard Copy", vol. 2170, pp. 170–181.
Article—"Color Interchange Mechanism Considering Color Adaption and Gamut Mapping", vol. 2, pp. 237–244.
Article—"Invited Address: White–Point Transformations and Color Data Interchange" vol. 23, pp. 560–563.

* cited by examiner

Primary Examiner—Phuoc Tran
Assistant Examiner—Ishrat Sherali
(74) Attorney, Agent, or Firm—Foley & Lardner

(57) ABSTRACT

Color matching method in which the color apparatus of a color image is adapted to be coincident between color image devices having significantly different reference whites with a small processing volume. From correlated color temperature of an originating reference white and a target reference white, spectral power distribution characteristics of an originating and a target color space are restored. Tristimulus values of the color in the target color space is obtained from the adaptive surface reflectance of the optional color, spectral power distribution characteristics of the target color space and the human color matching functions.

20 Claims, 10 Drawing Sheets

COLOR MATCHING METHOD, COLOR MATCHING APPARATUS AND MEDIUM HAVING A MACHINE-READABLE PRODUCT

FIELD OF THE INVENTION

This invention relates to a color reproduction technique for color images among different color image devices, such as a color scanner, a color monitor, a color printer etc. More particularly, it relates to a color matching method and apparatus required for converting an optional color in an originating color space to that of a target color space, in meeting with the chromatic adaptation state of the human visual system, as the color appearance correspondence is maintained between different color systems having different white references.

BACKGROUND OF THE INVENTION

When a color image displayed on a monitor such as a cathode-ray tube (CRT) monitor for color reproduction between different color image devices is to be output to a color printer, color reproduction frequently presents a problem. In general, the correlated color temperature of the reference white, set as a default reference, in most CRT monitors, is set to approximately 9000 K. In the case of a printer, on the other hand, the color when illuminated with D50 (correlated color temperature: 5000 K), as the standard light source for color evaluation for printing, is evaluated. In short, for color reproduction between monitor and printer, the color displayed on a monitor set to the standard white of 9000 K needs to be compared to the color of the printer output illuminated with the standard light source of 5000 K. However, even insofar as only the white is concerned, the appearance of the color with the correlated color temperature of 9000 K perceived by us differs from that with the correlated color temperature of 5000 K.

For sensibly realizing this difference between the two whites, two monitors are provided, with one of them being set to a standard white with a correlated color temperature of 9000 K, with the remaining monitor being set to a standard white with a correlated color temperature of 5000 K. If the respective whites are displayed on the two monitors and compared to each other, the difference in the color appearance can be perceived easily. If, in the state where the user's eye is completely adapted to the monitor of the standard white with the correlated color temperature of 9000 K, the user sees the white displayed on the monitor of the standard white with the correlated color temperature of 5000 K, the latter is perceived as being the yellowish color clearly different from the white. The reverse is also true, that is, if the user's eye is completely adapted to the monitor of the standard white with the correlated color temperature of 5000 K, the user sees the white with the correlated color temperature of 9000 K as being palish (bluish) white.

However, if, in an environment that can control the ambient light, such as in a darkroom and, with a partition placed between both eyes, the monitor of 9000 K and that of 5000 K continue to be viewed with left and right eyes, respectively, the color appearance of the two whites gradually becomes similar (approach each other) due to progressive chromatic adaptation of both eyes. That is, since the color appearances of the two whites differ due to the state of our chromatic adaptation, such color conversion which takes our chromatic adaptation into account is indispensable in order to realize color coincidence between color image devices having different reference whites.

As a color conversion method, which takes the human chromatic adaptation into account, the von Kries model is well-known. This conversion method is shown in FIG. 10. According to this method, the chromatic adaptation is carried out based on the change in the RGB spectral sensitivity in the human visual system such that the RGB spectral sensitivity is upon change in illumination, changed in its sensitivity balance without changes in shape of the spectral curves so as to bring the two whites into coincidence. Assume RGB values of the illumination 1 be (R0, G0, B0), the RGB values of an object (article) in illumination 1 be (R, G, B), and RGB values of illumination 2 be (R0', G0', B0'), with RGB values of the same object under illumination 2 being (R', G', B'), the tri-color sensual quantities of the visual system of the object color are expressed by: R/R0, G/G0, B/B0, R'/R0', G'/G0', B'/B0'. In order for the color appearance of the object to be coincident under the illumination 1 and under the illumination 2, it suffices if the above-mentioned tri-color sensual quantities are coincident, as shown below:

$$\begin{bmatrix} R/R0 \\ G/G0 \\ B/B0 \end{bmatrix} = \begin{bmatrix} R'/R0' \\ G'/G0' \\ B'/B0' \end{bmatrix} \quad (1)$$

$$\begin{bmatrix} 1/R0 & 0 & 0 \\ 0 & 1/G0 & 0 \\ 0 & 0 & 1/B0 \end{bmatrix} \begin{bmatrix} R \\ G \\ B \end{bmatrix} = \begin{bmatrix} 1/R0' & 0 & 0 \\ 0 & 1/G0' & 0 \\ 0 & 0 & 1/B0' \end{bmatrix} \begin{bmatrix} R' \\ G' \\ B' \end{bmatrix} \quad (2)$$

The RGB values can be obtained by linear transformation of tristimulus values X, Y, Z:

$$\begin{bmatrix} R \\ G \\ B \end{bmatrix} = M \begin{bmatrix} X \\ Y \\ Z \end{bmatrix}, \quad \begin{bmatrix} R' \\ G' \\ B' \end{bmatrix} = M \begin{bmatrix} X' \\ Y' \\ Z' \end{bmatrix} \quad (3)$$

It is noted that R0, G0, B0, R0', G0', B0' in the above formula (1) may be obtained by substituting tristimulus values (X0, Y0, Z0), (X0', Y0', Z0') of the illumination 1 and the illumination 2 shown in FIG. 11 into formula (3).

In the XYZ→CRGB transformation matrix M of formula (3), Pitt's matrix or Estevez' matrix may be used.

By substituting equation (3) into equation (2), the following von Kries chromatic adaptation prediction formula is obtained:

$$\begin{bmatrix} X' \\ Y' \\ Z' \end{bmatrix} = M^{-1} DM \begin{bmatrix} X \\ Y \\ Z \end{bmatrix} \quad (4)$$

In the above formula (4), $$D = \begin{bmatrix} R0'/R0 & 0 & 0 \\ 0 & G0'/G0 & 0 \\ 0 & 0 & B0'/B0 \end{bmatrix} \quad (5)$$

It is seen from above that the color on the reproducing side corresponding to tristimulus values (X, Y, Z) of the input color on the original side in an observing booth shown in FIG. 11 can be calculated from the von Kries chromatic adaptation prediction formula (4).

Nayatani et al proposed a chromatic adaptation model combining the linear process in which the von Kries chromatic adaptation model is valid and the non-linear process in which an exponent varies responsive to the adaptation level. This chromatic adaptation model was recommended by CIE in 1986 as a chromatic adaptation prediction formula. This chromatic adaptation prediction formula is hereinafter explained.

First, tristimulus values X, Y, Z of the input color on the original side in FIG. 11 are transformed, by using Estevez' matrix, into basic stimulus values RGB in accordance with the following formula (6):

$$\begin{bmatrix} R \\ G \\ B \end{bmatrix} = \begin{bmatrix} 0.40024 & 0.70760 & -0.08081 \\ -0.22639 & 1.16532 & 0.04570 \\ 0.0 & 0.0 & 0.91822 \end{bmatrix} \begin{bmatrix} X \\ Y \\ Z \end{bmatrix} \quad (6)$$

From the basic stimulus values RGB of the input color, basic stimulus values R', G', B' of the corresponding colors are calculated.

$$R'=(100\rho_0'\xi'+1)\{(R+1)/(100\rho_0\xi+1)\}^{Pr}-1$$

$$G'=(100\rho_0'\eta'+1)\{(G+1)/(100\rho_0\eta+1)\}^{Pg}-1$$

$$R'=(100\rho_0'\zeta'+1)\{(B+1)/(100\rho_0\zeta+1)\}^{Pb}-1 \quad (7)$$

For the corresponding colors R', G', B', the formula (6) is inverse transformed (as shown by the following formula (8)) to calculate tristimulus values X', Y', Z' of the corresponding color:

$$\begin{bmatrix} X' \\ Y' \\ Z' \end{bmatrix} = \begin{bmatrix} 1.85995 & -1.12939 & 0.21990 \\ 0.36119 & 0.63881 & 0.0 \\ 0.0 & 0.0 & 1.08906 \end{bmatrix} \begin{bmatrix} R' \\ G' \\ B' \end{bmatrix} \quad (8)$$

In the above formula (7), $\rho o$, $\rho o'$ denote reflectances of the surrounding environments on the original and reproducing sides, respectively, with $0.2 \leq \rho o \leq 0.1$ and $0.2 \leq \rho o' \leq 1.0$, and $\xi$, $\eta$, $\zeta$ are as indicated by the following formulas:

$$\xi=(0.48105x+0.78841y-0.08081)/y$$

$$\eta=(-0.27200x+1.11962y+0.04570)/y$$

$$\zeta=0.91822(1-x-y)/y \quad (9)$$

where x, y denote chromaticity of the illumination 1. $\xi'$, $\eta'$, and $\zeta'$ are calculated in a similar manner using the chromaticity of the illumination 2 in x and y.

$$Pr=f(R_0)/f(R_0')$$

$$Pg=f(G_0)/f(G_0')$$

$$Pb=g(B_0)/g(B_0') \quad (10)$$

where functions $f()$ and $g()$ are as follows:

$$f(x)=(6.469+6.362x^{0.4495})/(6.469+x^{0.4495}) \quad (11)$$

$$g(x)=(8.414+8.091x^{0.5128})/(8.414+x^{0.5128}) \quad (12)$$

Nayatani et al improved the above-mentioned CIE1986 chromatic adaptation prediction formula in 1990 and in 1994 and, in 1995, completed a color appearance model (Nayatani model) in a publication (Y. Nayatani et al: Lightness Dependency of Chroma Scales of a Nonlinear Color-Appearance Model and its Latest Formulation, Color Res. Appl., Vol. 20, No. 3, pp. 156–167, June 1995).

Further the correction method for taking into account of incomplete chromatic adaptation state of the human visual system was added in 1996 and 1997.

Fairchild has proposed RLAB as a color appearance model. The calculating method of the present model is explained. First, basic stimulus values LMS are found from tristimulus values XYZ in the original side in accordance with the following formula (13):

$$\begin{bmatrix} L \\ M \\ S \end{bmatrix} = \begin{bmatrix} 0.3897 & 0.6890 & -0.0787 \\ -0.2298 & 1.1834 & 0.0464 \\ 0.0 & 0.0 & 1.0 \end{bmatrix} \begin{bmatrix} X \\ Y \\ Z \end{bmatrix} \quad (13)$$

A transformation matrix A for chromatic adaptation then is found. The calculating method is as follows:

$$A = \begin{bmatrix} \alpha_L & 0 & 0 \\ 0 & \alpha_M & 0 \\ 0 & 0 & \alpha_S \end{bmatrix} \quad (14)$$

$$\alpha_L = \frac{P_L + D(1.0 - P_L)}{L_n} \quad (15)$$

$$\alpha_M = \frac{P_M + D(1.0 - P_M)}{M_n} \quad (16)$$

$$\alpha_S = \frac{P_S + D(1.0 - P_S)}{S_n} \quad (17)$$

$$P_L = \frac{1.0 + Y_n^{1/3} + l_Z}{1.0 + Y_n^{1/3} + 1.0/l_Z} \quad (18)$$

$$P_M = \frac{1.0 + Y_n^{1/3} + m_Z}{1.0 + Y_n^{1/3} + 1.0/m_Z} \quad (19)$$

$$P_S = \frac{1.0 + Y_n^{1/3} + s_Z}{1.0 + Y_n^{1/3} + 1.0/s_Z} \quad (20)$$

$$l_E = \frac{3.0 L_n}{L_n + M_n + S_n} \quad (21)$$

$$m_E = \frac{3.0 M_n}{L_n + M_n + S_n} \quad (22)$$

$$s_E = \frac{3.0 S_n}{L_n + M_n + S_n} \quad (23)$$

The tristimulus values XYZ of the input color are transformed into corresponding stimulus values Xref, Yref and Zref under the reference observation conditions in accordance with the following formula (24):

$$\begin{bmatrix} X_{ref} \\ Y_{ref} \\ Z_{ref} \end{bmatrix} = RAM \begin{bmatrix} X \\ Y \\ Z \end{bmatrix} \quad (24)$$

In the above formulas, Yn is an absolute adaptation luminance of the illumination (cd/m$^2$), and Ln, Mn and Sn are the basic stimulus values of the illumination. The constant D in formulas (15) to (17) is set to 1.0, 0.0 and to an intermediate value for a hard copy image, monitor display and for a slide, respectively. The constant matrix R in formula (24) is as follows:

$$R = \begin{bmatrix} 1.9569 & -1.1882 & 0.2313 \\ 0.3612 & 0.6388 & 0.0 \\ 0.0 & 0.0 & 1.0 \end{bmatrix} \quad (25)$$

The RLAB values then are calculated using the reference tristimulus values Xref, Yref and Zref.

$$L^R = 100(Y_{ref})^\sigma \quad (26)$$

$$a^R = 430[(X_{ref})^\sigma - (Y_{ref})^\sigma] \quad (27)$$

$$b^R = 170[(Y_{ref})^\sigma - (Z_{ref})^\sigma] \quad (28)$$

where σ assumes the following values, responsive to the observing environment:

σ=1/2.3 for an average ambient environment;
σ=1/2.9 for a dim ambient environment; and
σ=1/3.5 for a dark ambient environment.

As for the corresponding colors X'Y'Z' under the illumination 2, reverse calculations of the formulas (26) to (28) are carried out from the RLAB values corresponding to the input color of the illumination 1 to compute the reference tristimulus values Xref', Yref' and Zref' for the illumination 2.

The corresponding colors X' Y' Z' in the illumination 2 can be calculated by substitution into the right side of the equation (29) which is the reverse calculation of the formula (24). It is noted however that the matrix calculated for the illumination 2 can be used as the matrix A of the formula (29).

As other color appearance models, a Hunt model by Hunt, LLAB by Luo and CIECAM97s recommended by CIE in autumn of 1997, are attracting attention as models of significance, and evaluation is underway on the color appearance models among cross media.

SUMMARY OF THE DISCLOSURE

As for the color appearance coincidence of the color images between color image devices with different reference whites, such as between a monitor and a printer, there is a problem of color appearance to which the human chromatic adaptation as a human visual function is intricately pertinent.

Many of the currently proposed color appearance models perform modeling of various color appearance phenomena of the human color perception through a complex calculation formula. In particular, Hunt model and Nayatani model require very complicated calculations in order to represent the various color appearance phenomena. It is, however, open to doubt whether all the appearance phenomena considered in these models are really necessary in the practical utilization of color management on the computer system. That is, if the totality of appearance phenomena would be considered, the proposed chromatic adaptation models cannot be said to be practical in view of correspondingly increased computational costs.

On the other hand, the von Kries chromatic adaptation model, which changes the ratio of the spectral sensitivity on the human retina level, responsive to the illumination color, without changing its shape of spectral curves, is suited to the color management function on the computer system, because of the smaller number of parameters required for calculation and the low computing costs. However, as for the problem of color appearance between a monitor and a printer having acutely different reference whites, it is not possible with the von Kries model to realize an optimum color appearance.

There is a demand for a model which gives practically coincident color appearance of the color images and entails low computing costs in realizing the color matching of color images between different color image devices on a computer system.

In view of the above-described status of the art, it is an object of the present invention to provide a method and apparatus for color matching according to which coincidence of color appearance of color images between color image devices having significantly different reference whites can be achieved with a small computational volume taking into account the chromatic adaptation state of the human visual system.

According to a first aspect of the present invention, there is provided a color matching method for converting an optional color in an originating color space to a color in a target color space, keeping the color appearance. The method comprises the steps of:

(a) restoring spectral power distribution characteristics of an originating color space from a correlated color temperature of an originating reference white which is the reference white in said originating color space, and restoring spectral power distribution characteristics of a target (objective) color space from a correlated color temperature of a target (objective) reference white which is the reference white in the target color space;

(b) restoring, as a surface reflectance of the originating reference white, a first white surface reflectance from tristimulus values of the originating reference white, spectral power distribution characteristics of the originating color space and color matching functions of the human visual system (termed as "human color matching functions" hereinafter), and also restoring a second white surface reflectance from tristimulus values of the originating reference white, spectral power distribution characteristics (i.e., spectra) of the target color space and the human color matching functions;

(c) obtaining an adaptive white surface reflectance thorough interpolation of the first and second white surface reflectances;

(d) calculating a ratio of the first white surface reflectance to the adaptive white surface reflectance to obtain a spectral chromatic adaptation ratio;

(e) restoring a surface reflectance of the optional color in the originating color space by employing tristimulus values of the optional color, spectral power distribution characteristics of the originating color space and the human color matching functions;

(f) multiplying the surface reflectance of the optional color with the spectral chromatic adaptation ratio to obtain an adaptive surface reflectance of the optional color; and (g) finding tristimulus values of the color in the target color space from the adaptive surface reflectance of the optional color, the spectral power distribution characteristics of the target color space and the human color matching functions.

With the color matching method of the present invention, in the step (c) of obtaining adaptation white surface reflectance from the interpolation of the first and second white surface reflectances, an incomplete chromatic adaptation coefficient is changed responsive to the state of incomplete chromatic adaptation in the human visual system, the degree of interpolation of the first and second white surface reflectances is freely changed to obtain the adaptation white surface reflectance.

The color matching method of the present invention further comprises the step of calculating an optimum incomplete chromatic adaptation coefficient from combination of the reference white of the originating color space and the reference white of the target color space, the incomplete chromatic adaptation coefficient obtained from the optimum incomplete chromatic adaptation coefficient calculating step being used.

According to a second aspect of the present invention, a color matching apparatus is configured for converting an optional color in an originating color image device to a color in a target color image device, keeping the color appearance. The color matching apparatus comprises:

(a) means for restoring spectral power distribution characteristics of an originating color space from a correlated color temperature of an originating reference white which is the reference white of the originating color image device, and restoring spectral power distribution characteristics of the target color space from a correlated color temperature of a target reference white which is the reference white of the target color image device, (b) means for restoring, as a surface reflectance of the originating reference white, a first white surface reflectance from tristimulus values of the originating reference white, the spectral power distribution characteristics of the originating color space and human color matching functions, and also restoring a second white surface reflectance from tristimulus values of the originating reference white, spectral power distribution characteristics of the target color space and the human color matching functions, (c) means for obtaining an adaptive white surface reflectance through interpolation of the first and second white surface reflectances, (d) means for calculating a ratio of the first white surface reflectance to the adaptive white surface reflectance to obtain a spectral chromatic adaptation ratio, (e) means for restoring a surface reflectance of the optional color in the originating color image device by employing tristimulus values of the optional color, spectral power distribution characteristics of the originating color space and the human color matching functions, (f) means for multiplying the surface reflectance of the optional color with the spectral chromatic adaptation ratio to obtain an adaptive surface reflectance of the optional color, (g) means for finding tristimulus values of the color in the target color image device from the adaptive surface reflectance of the optional color, the spectral power distribution characteristics of the target color space and the human color matching functions.

In the color matching apparatus of the present invention, an incomplete chromatic adaptation coefficient is changed in the means for obtaining adaptive white surface reflectance from the interpolation of the first and second white surface reflectances, responsive to the state of incomplete chromatic adaptation in the human visual system, so that the degree of interpolation of the first and second white surface reflectances freely changed to obtain the adaptive white surface reflectance.

The color matching apparatus of the present invention also includes means for calculating an optimum incomplete chromatic adaptation coefficient from combination of the reference white of the originating color image device and the reference white of the target color image device, the incomplete chromatic adaptation coefficient obtained from the optimum incomplete chromatic adaptation coefficient calculating means being then used.

The color matching apparatus also includes means for computing the correlated color temperature of the reference white from the chromaticity of the reference white of the color image device.

PREFERRED EMBODIMENTS OF THE INVENTION

Figure 1:
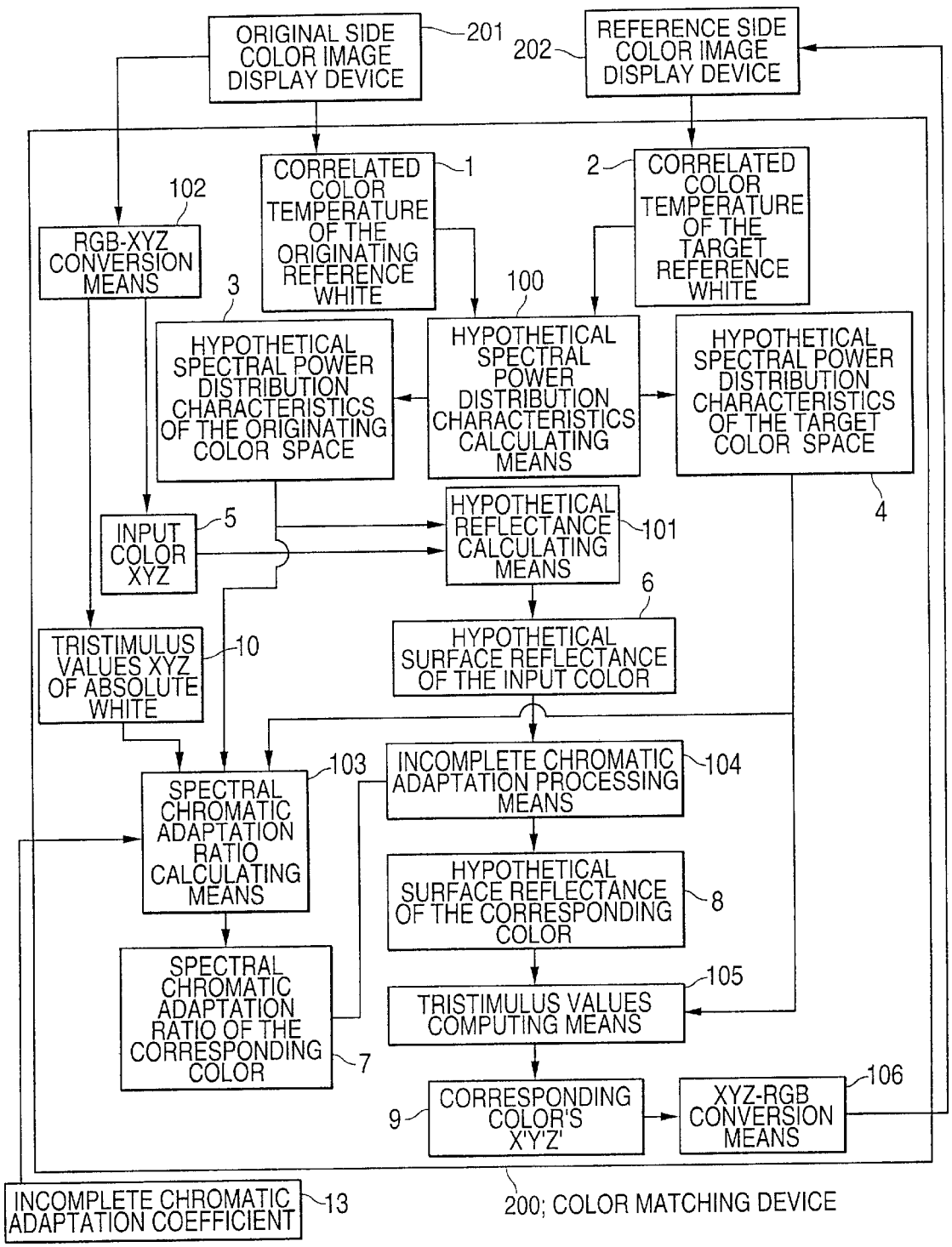
FIG. 1 is a block diagram showing the structure of a first embodiment of the color matching device according to the present invention.

Preferred embodiments of the present invention are explained. In its preferred form, the color matching apparatus of the present invention includes hypothetical spectral power distribution characteristics calculating means (100 of FIG. 1) for restoring spectral power distribution characteristics (3 of FIG. 1) of the originating color space from the correlated color temperature (1 of FIG. 1) of the originating reference white as a reference white in the originating color image device (201 of FIG. 1), and for restoring spectral power distribution characteristics (4 of FIG. 1) in the target color space from the correlated color temperature (2 of FIG. 1) of the target reference white as the reference white in the target color image device (202 of FIG. 1). The color matching apparatus of the present invention also includes hypothetical surface reflectance calculating means (101' of FIG. 2) for restoring, as a surface reflectance of the originating reference white, a first white surface reflectance (11 of FIG. 2) from tristimulus values of the originating reference white (10 of FIG. 1), spectral power distribution characteristics of the originating color space (3 of FIG. 1) and human color matching functions, and for restoring a second white surface reflectance (12 of FIG. 2) from tristimulus values of the originating reference white (10 of FIG. 1), spectral power distribution characteristics of the target color space (4 of FIG. 1) and human color matching functions. The color matching apparatus of the present invention also includes incomplete absolute white adaptation calculating means (107 of FIG. 2) for obtaining adaptive white surface reflectance (14 of FIG. 2) based on interpolation of the first and second white surface reflectances, and ratio computing means (108 of FIG. 2) for obtaining the spectral chromatic adaptation ratio (7 of FIGS. 1 and 2) based on calculations of the ratio of the first white surface reflectance and adaptive white surface reflectance. The color matching apparatus of the present invention also includes hypothetical reflectance calculating means (101 of FIG. 1) for restoring surface reflectance of an optional color in an originating color image device (6 in FIG. 1) by using tristimulus values of the optional color (5 of FIG. 1), spectral power distribution characteristics (3 of FIG. 1) of the originating color space and human color matching functions. The color matching apparatus of the present invention also includes incomplete chromatic adaptation processing means (104 of FIG. 1) for obtaining the adaptive surface reflectance (8 of FIG. 1) of the optional color by multiplying the surface reflectance of the optional color (6 in FIG. 1) with a spectral chromatic adaptation ratio (7 of FIG. 1) and tristimulus values computing means (106 of FIG. 1) for finding the tristimulus values of the color in the target color image device from the adaptive surface reflectance of the optional color, spectral power distribution characteristics of the target color space and human color matching functions. The color matching apparatus of the present invention also includes XYZ-RGB converting means (106 of FIG. 1) for converting the tristimulus values of the target color image device into device color data of the target color image device.

In its alternative form, the color matching apparatus of the present invention includes means for calculating an optimum incomplete chromatic adaptation coefficient (206 of FIG. 5) for finding an optimum incomplete chromatic adaptation coefficient (13 of FIG. 5) from combination of correlated color temperature of the reference white (1 of FIG. 5) of the originating color image device and correlated color temperature (2 of FIG. 5) of the target reference white of the target color image device, the incomplete chromatic adaptation coefficient obtained from the optimum incomplete chromatic adaptation coefficient calculating means being used.

The color matching apparatus of the present invention also includes calculating means (109 of FIG. 6) for calculating the correlated color temperature of the reference white from the chromaticity of the reference white of the color image device.

Figure 9:
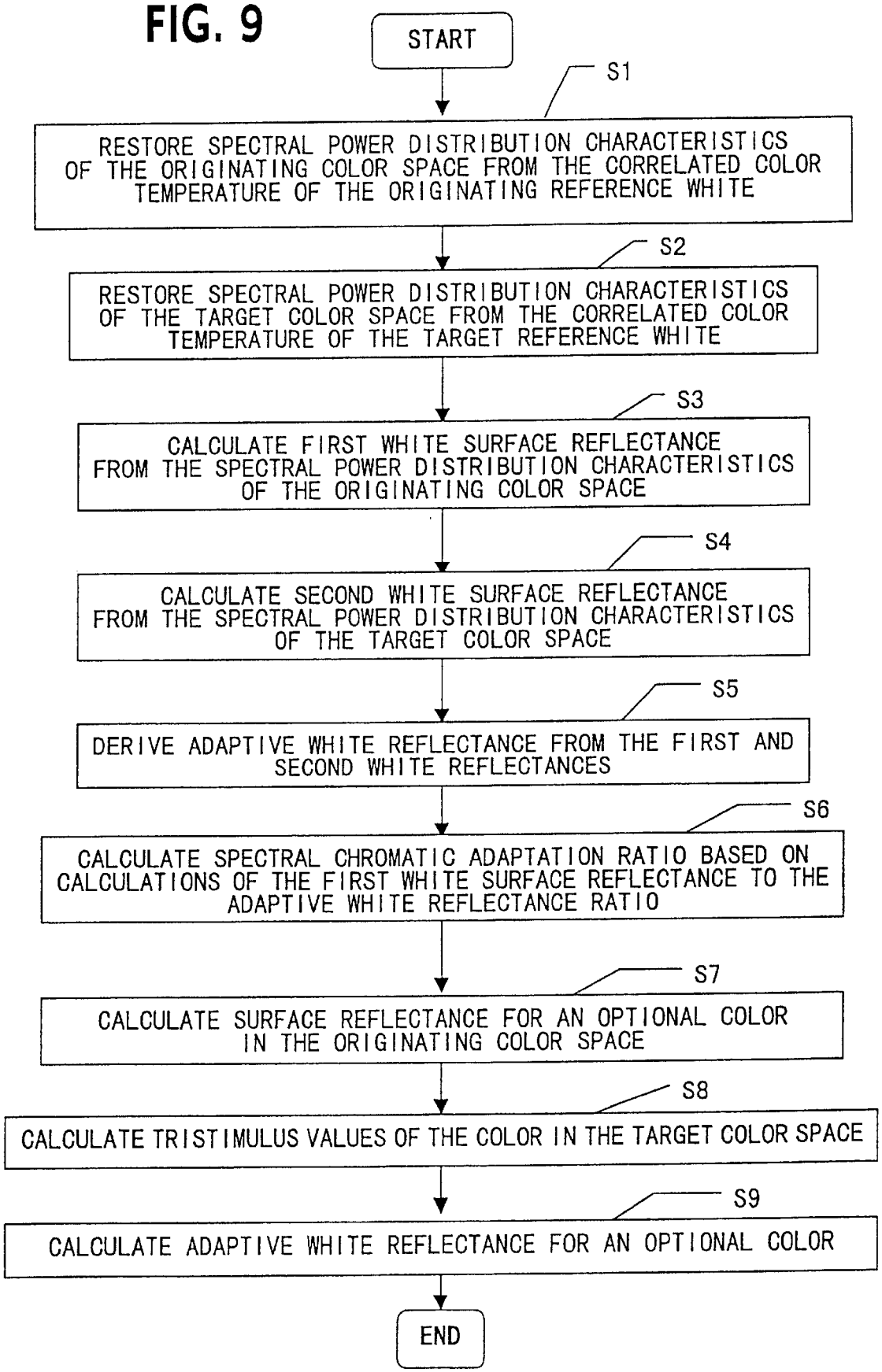
FIG. 9 is a flow diagram showing processing flow of the color matching device according to the present invention.
Figure 10:
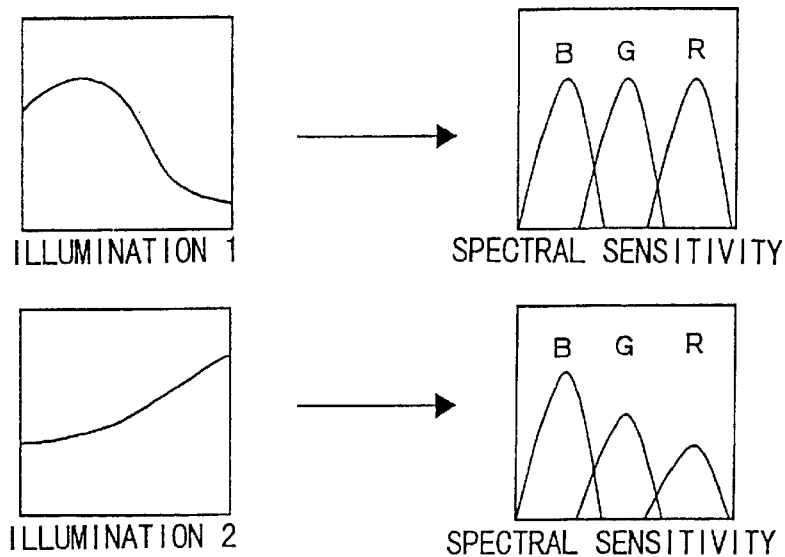
FIG. 10 illustrates a von Kries chromatic adaptation model.
Figure 11:
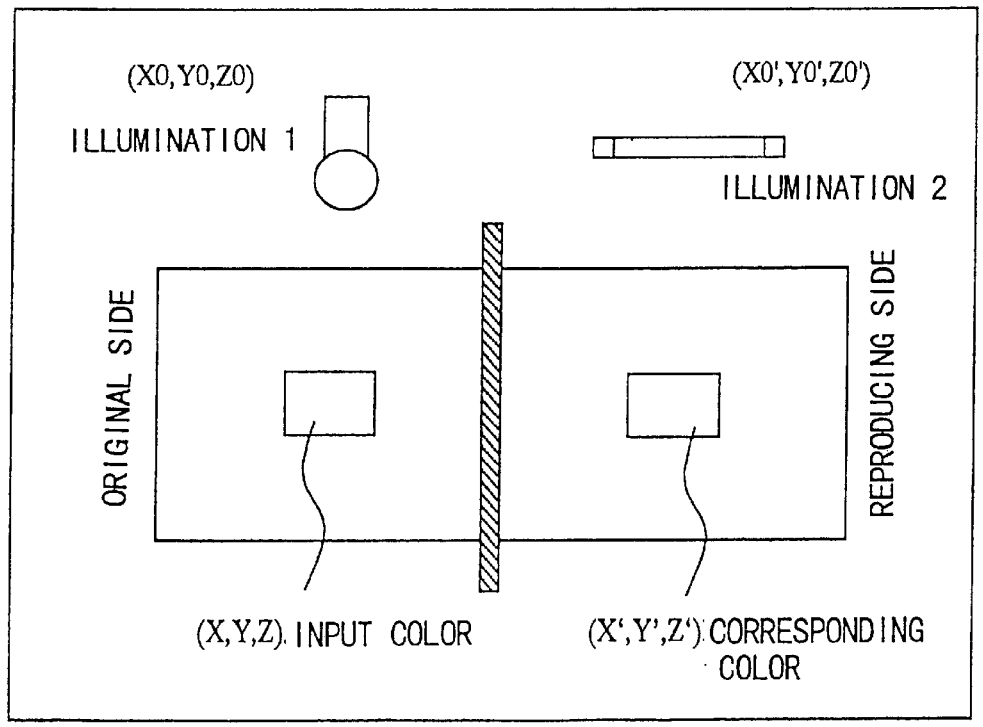
FIG. 11 illustrates the state of color comparison under different illuminating environments.

The color matching method of the present invention includes a step of restoring spectral power distribution characteristics of an originating color space from a correlated color temperature of an originating reference white which is the reference white of the originating color space and restoring spectral power distribution characteristics of a target color space from a correlated color temperature of a target reference white which is the reference white of the target color space (S1 and S2 of FIG. 9);

a step of restoring, as a surface reflectance of the originating reference white, a first white surface reflectance from tristimulus values of the originating reference white, the spectral power distribution characteristics of the originating color space and human color matching functions, and also restoring a second white surface reflectance from tristimulus values of the originating reference white, spectral power distribution characteristics of the target color space and human color matching functions (S3 and S4 in FIG. 9);

a step of obtaining an adaptive white surface reflectance through interpolation of the first and second white surface reflectances (S5 of FIG. 9);

a step of calculating the ratio of the first white surface reflectance to the adaptive white surface reflectance to obtain a spectral chromatic adaptation ratio (S6 of FIG. 9);

a step of restoring a surface reflectance of the optional color in the originating color space by employing tristimulus values of the optional color, spectral power distribution characteristics of the originating color space and human color matching functions (spectral chromatic adaptation ratio) (S7 of FIG. 9);

a step of multiplying the surface reflectance of the optional color with the spectral chromatic adaptation ratio to obtain an adaptive surface reflectance of the optional color (S8 of FIG. 9); and a step of finding tristimulus values of the color in the target color space from the adaptive surface reflectance of the optional color, the spectral power distribution characteristics of the target color space and the human color matching function (S9 of FIG. 9).

In the present embodiment of the present invent ion, the processing of steps S1 to S9 may be carried out by program control executed on a computer. The present invention can be carried out by reading out a program from a recording medium having recorded the program thereon and executing the read-out program. This program is deemed a computer readable program product which may be also carried/ contained/transmitted by any medium available which includes static and dynamic media, e.g. recording medium, physical medium such as carrier wave of electromagnetic and/or optical nature.

DETAILED DESCRIPTION OF THE EMBODIMENTS

Referring to the drawings, present embodiments of the present invention will be explained in detail. First, an embodiment of the color matching method according to the present invention is explained.

The color matching in case of two color image devices, that i s a color image device on the 'original side and another one on the reproducing side, have different reference whites, is explained. It is assumed that the correlated color temperature of the reference whites of the original side and the reproducing side color image device and tristimulus values XYZ are given from the outset.

First, hypothetical spectral power distribution characteristics Iv1($\lambda$), equivalent to the color of illumination 1 in a color image scene reproduced by a color image device on the original side, and hypothetical spectral power distribution characteristics Iv2($\lambda$), equivalent to the color of illumination 2 in a color image scene reproduced by a color image device on the reproducing side, are calculated based on a correlated color temperature of a reference white light of each color image device. As the method of calculating the hypothetical spectral power distribution characteristics, equivalent to the illumination color in the color image scene, the technique disclosed in the Japanese Patent Application H-9-047334 (Kokai Publication JP-A-10-229499) by the present inventor, may be used, the entire disclosure of which is incorporated herein by reference thereto.

Given an absolute white as an input color on the original side, its tristimulus values (Xw, Yw, Zw) coincide with tristimulus values (X0, Y0, Z0) of the illumination 1 in the image scene.

$$(Xw, Yw, Zw)=(X0, Y0, Z0)$$

From the tristimulus values (X0, Y0, Z0) of the absolute white and the hypothetical spectral power distribution characteristics Iv1($\lambda$) calculated from the correlated color temperature of the illumination 1, it is possible to calculate the hypothetical surface reflectance Rwv($\lambda$) of the absolute white on the original side. For restoring the hypothetical surface reflectance of an object from the tristimulus values of the object and hypothetical spectral power distribution characteristics of the illumination, a restoration method described in the Japanese patent Application H-9-047334 may be used.

It is now envisaged to reproduce the tristimulus values (Xw, Yw, Zw) of the absolute white on the original side on a reference side color image having the illumination 2 in the scene with the identical tristimulus values (Xw, Yw, Zw). From the tristimulus values (Xw, Yw, Zw) of the absolute white on the original side and the hypothetical spectral power distribution characteristics Iv2($\lambda$) calculated from the correlated color temperature of the illumination 2, the hypothetical surface reflectance Rwv'($\lambda$) of the absolute white on the reference side is calculated using a method similarly described in the Japanese Patent Application H-9-047334 (JP-A-10-229499).

It is seen from above that, as to the absolute white, two hypothetical surface reflectances, namely Rwv($\lambda$) on the original side color image device and Rwv'($\lambda$) on the reflectance side color image device have now been obtained.

For coping with the situation in which the color perception of the viewer has been incompletely adapted between the original and reference side color image devices, the incomplete chromatic adaptation coefficient adj (real number such that $0 \leq adj \leq 1$) is defined.

The hypothetical surface reflectance Rwv$_{ad}$($\lambda$), for which the color appearance of the absolute white of the two color image devices coincide in the state of incomplete chromatic adaptation of a viewer, is calculated, using the calculated hypothetical surface reflectances Rwv($\lambda$) and Rwv'($\lambda$) of the absolute white for the original side and the reference side, respectively, in accordance with the following formula (29):

$$Rwv_{ad}(\lambda)=adj \times Rwv(\lambda)+(1-adj) \times Rwv'(\lambda) \qquad (29)$$

As for colors other than the absolute white, the following explanation is given. From the hypothetical surface reflectance Rwv$_{ad}$($\lambda$) of the absolute white in the state of incomplete chromatic adaptation obtained by the formula (29) and the hypothetical surface reflectance Rwv($\lambda$) of the absolute white under the illumination 1, a specific coefficient is calculated for each wavelength in the visible light range and represented as ref$_{coef}$($\lambda$) as the spectral chromatic adaptation ratio. The spectral chromatic adaptation ratio ref$_{coef}$($\lambda$) is represented by the following formula (30):

$$ref_{coef}(\lambda)=Rwv_{ad}(\lambda)/Rwv(\lambda) \qquad (30)$$

From the hypothetical spectral power distribution characteristics Iv1($\lambda$), calculated from the correlated color temperature of the illumination 1, and the tristimulus values XYZ of an optional color in the color image on the original side, the hypothetical surface reflectance Rv($\lambda$) equivalent for the object color is calculated, using the technique stated in, for example, Japanese Patent Application H-9-047334 (JP-A-10-229499).

The hypothetical surface reflectance Rv($\lambda$) is multiplied with the spectral chromatic adaptation ratio ref$_{coef}$($\lambda$) of the formula 30, from one wavelength to another. That is, the hypothetical surface reflectance Rv$_{ad}$($\lambda$) of the optional input color in the incomplete chromatic adaptation state is given by the following formula (31):

$$Rv_{ad}(\lambda)=Rv(\lambda) \times ref_{coef}(\lambda) \qquad (31)$$

Tristimulus values X', Y', Z' of a corresponding color on the reproducing side color image device, which color corresponds to an input color in a color image, reproduced on the original side color image device, can be calculated by the following formula (32):

$$X'=\int I_{v2}(\lambda)Rv_{ad}(\lambda)\bar{x}(\lambda)d\lambda$$
$$Y'=\int I_{v2}(\lambda)Rv_{ad}(\lambda)\bar{y}(\lambda)d\lambda$$
$$Z'=\int I_{v2}(\lambda)Rv_{ad}(\lambda)\bar{z}(\lambda)d\lambda \qquad (32)$$

exploiting the hypothetical surface reflectance Rv$_{ad}$($\lambda$) of the object in the state of incomplete chromatic adaptation and the calculated hypothetical spectral power distribution characteristics Iv2($\lambda$) of the illumination on the reproducing side.

In the formula (32), $\bar{x}(\lambda)$, $\bar{y}(\lambda)$, and $\bar{z}(\lambda)$ are known color matching functions.

An embodiment of a color matching device according to the present invention is now explained. FIG. 1 shows a block diagram showing the structure of a first embodiment of the color matching device according to the present invention.

Referring to FIG. 1, to a color matching device 200 are connected a color image display device 201 on the original side for color reproduction with RGB values and a color image display device 202 on the reference side. The color characteristics of the respective color image display devices are assumed to be known from the outset. The color matching device 200 converts an optional color reproduced on the original side color image display device 201 into a color on the reproducing side color image display device 202 in such a manner as to achieve coincident color appearance of the two colors.

The color matching device 200 includes a hypothetical spectral power distribution characteristics calculating means 100, a hypothetical reflectance calculating means 101, an RGB-XYZ conversion means 102, a spectral chromatic adaptation ratio calculating means 103, an incomplete chromatic adaptation processing means 104, tristimulus values calculating means 105 and an XYZ-RGB conversion means 106. An incomplete chromatic adaptation coefficient 13 is entered as an input.

The operation of the first embodiment of the color matching device of the present invention is now explained.

The correlated color temperature 1 of the original reference white of the original side color image display device 201 is given as color characteristics of the color image display device. This correlated color temperature 1 of the original reference white is converted by the hypothetical spectral power distribution characteristics (spectra) calculating means 100 into hypothetical spectral power distribution characteristics (spectra) 3 of the originating color space corresponding to the illumination color of the original side. For this hypothetical spectral power distribution characteristics calculating means 100, the technique disclosed in for example the Japanese patent application H-9-047334 may, for example, be used.

Similarly, a correlated color temperature 2 of the target reference white of the reproducing side color image display device 202 is also given as color characteristics, and is converted by the hypothetical spectral power distribution characteristics calculating means 100 into hypothetical spectral power distribution characteristics (spectra) 4 of the target color space corresponding to the illumination color of the reproducing side.

The RGB-XYZ conversion means 102 converts optional RGB values in the color space of the color image display device 201 of the original side into tristimulus values XYZ. Since the color characteristics of the original side color image display device 201 are known from the outset, the RGB values may be converted by any suitable known technique into the tristimulus values XYZ. In this manner, XYZ values 5 of the input color are calculated for an optional color of the color space reproduced by the color image display device 201 of the original side.

From the hypothetical spectral power distribution characteristics 3 of the originating color space corresponding to the of the illumination color on the original side, calculated by the hypothetical spectral power distribution characteristics calculating means 100, and the input color XYZ values 5 from the color image reproduced on the original side color image display device 201, the hypothetical reflectance calculating means 101 calculates a hypothetical surface reflectance 6 of the input color corresponding to the object color not dependent on the illumination. For the hypothetical reflectance calculating means 101, the technique disclosed in, for example, the Japanese patent application H-9-047334 (JP-A-10-229499) etc. may be used.

The spectral chromatic adaptation ratio calculating means 103 calculates a spectral chromatic adaptation ratio $\text{ref}_{coef}$ ($\lambda$), used for realizing color appearance matching in the state of incomplete chromatic adaptation of the human color perception on the color matching method of the present invention.

Figure 2:
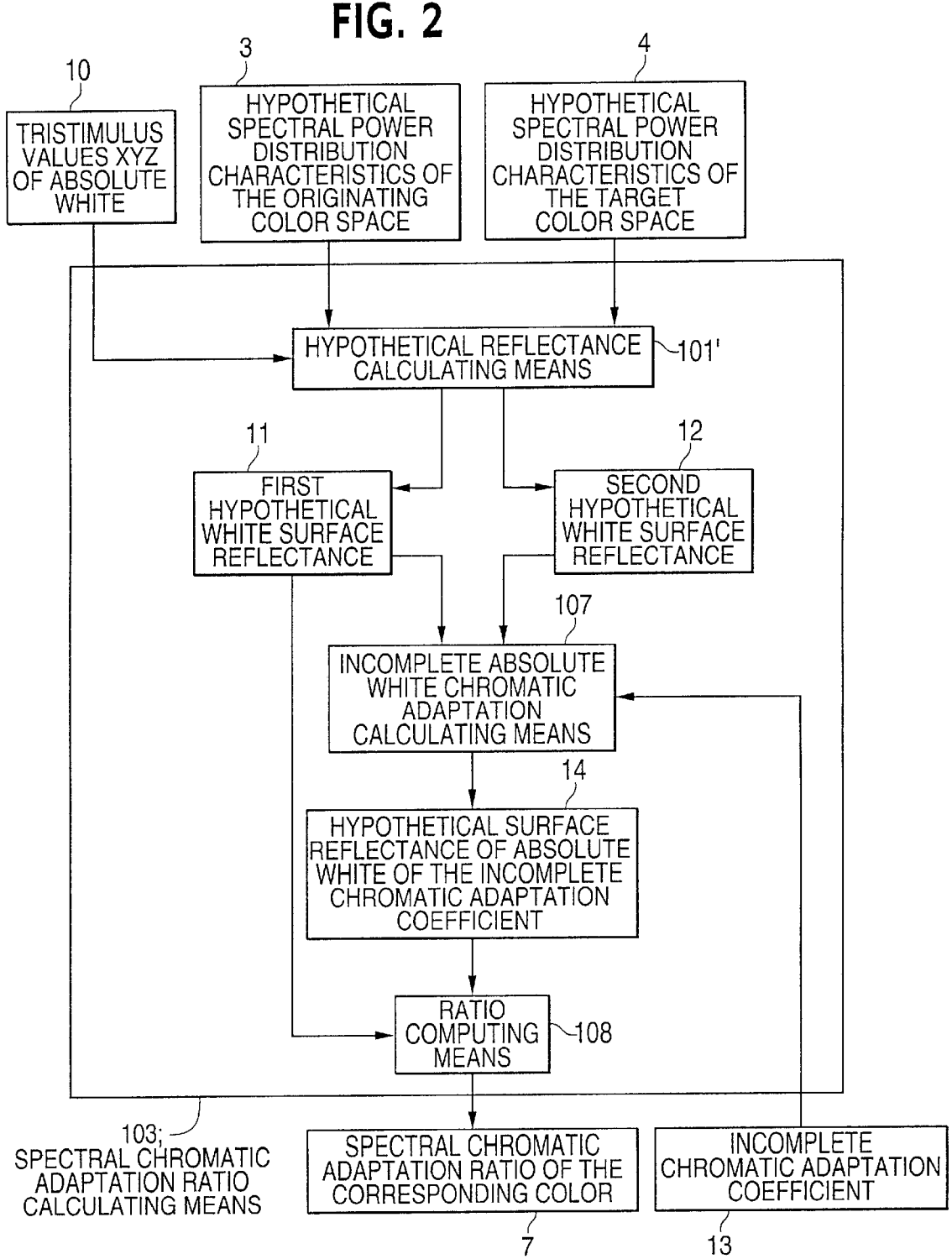
FIG. 2 is a block diagram showing the structure of a spectral chromatic adaptation ratio computing means in the first embodiment of the present invention.

FIG. 2 shows a block diagram showing the detailed structure of the spectral chromatic adaptation ratio calculating means 103. Referring to FIG. 2, the operation of the spectral chromatic adaptation ratio calculating means 103 is explained.

Referring to FIG. 2, the spectral chromatic adaptation ratio calculating means 103 calculates a first hypothetical white surface reflectance 11, in a hypothetical surface reflectance calculating means 101', from tristimulus values XYZ 10 of the absolute white, reproduced on the color image display device 201 on the original side and hypothetical spectral power distribution characteristics 3 of the originating color space corresponding to the illumination color on the original side. This hypothetical surface reflectance calculating means 101' is the same as the hypothetical reflectance calculating means 101 explained in connection with the color matching device 200. Also, a second hypothetical white surface reflectance 12 is calculated from the tristimulus values XYZ 10 of the absolute white, reproduced on the color image display device 201 on the original side, and hypothetical spectral power distribution characteristics 4 of the target color space, corresponding to the color of the illumination on the reproducing side.

An incomplete chromatic adaptation calculating means for absolute white 107 calculates, by the formula (29), the hypothetical surface reflectance 14 of the absolute white in the incomplete chromatic adaptation state for which color appearance of the absolute white in the incomplete chromatic adaptation state of the viewer coincides between the original and reference side color image devices, with the first hypothetical white surface reflectance 11, second hypothetical white surface reflectance 12 and an incomplete chromatic adaptation coefficient 13 as inputs. The incomplete chromatic adaptation coefficient 13 is used for coping with (or compensating for) the state of incomplete chromatic adaptation of the visual perception of the viewer between the original side color image display device and the reference side color image display device.

A ratio computing means 108 calculates spectral chromatic adaptation ratio 7 from a hypothetical surface reflectance 14 of the absolute white in the incomplete chromatic adaptation state and the first hypothetical white surface reflectance 11. The computing method is as shown in the formula (30).

Reference is again had to FIG. 1 for reverting to the explanation of the color matching device 200. The incomplete chromatic adaptation processing means 104 multiplies the hypothetical surface reflectance 6 of the input color on the original side by the above-mentioned spectral chromatic adaptation ratio 7, to output the hypothetical surface reflectance of the optional input color in the incomplete chromatic adaptation state, that is a hypothetical surface reflectance 8 of the corresponding color.

The tristimulus value calculating means 105 computes X', Y', Z' of the corresponding color 9, in accordance with the formula (32), from the hypothetical surface reflectance 8 of the corresponding color, hypothetical spectral power distribution characteristics 4 corresponding to the illumination color on the reproducing side and from the color matching functions.

Finally, the X', Y', Z' of the corresponding color 9 are converted by the XYZ-RGB conversion means 106 into RGB value of the color image display device 202 on the reproducing side to output the resulting RGB values to the color image display device 202 on the reproducing side.

Figure 3:
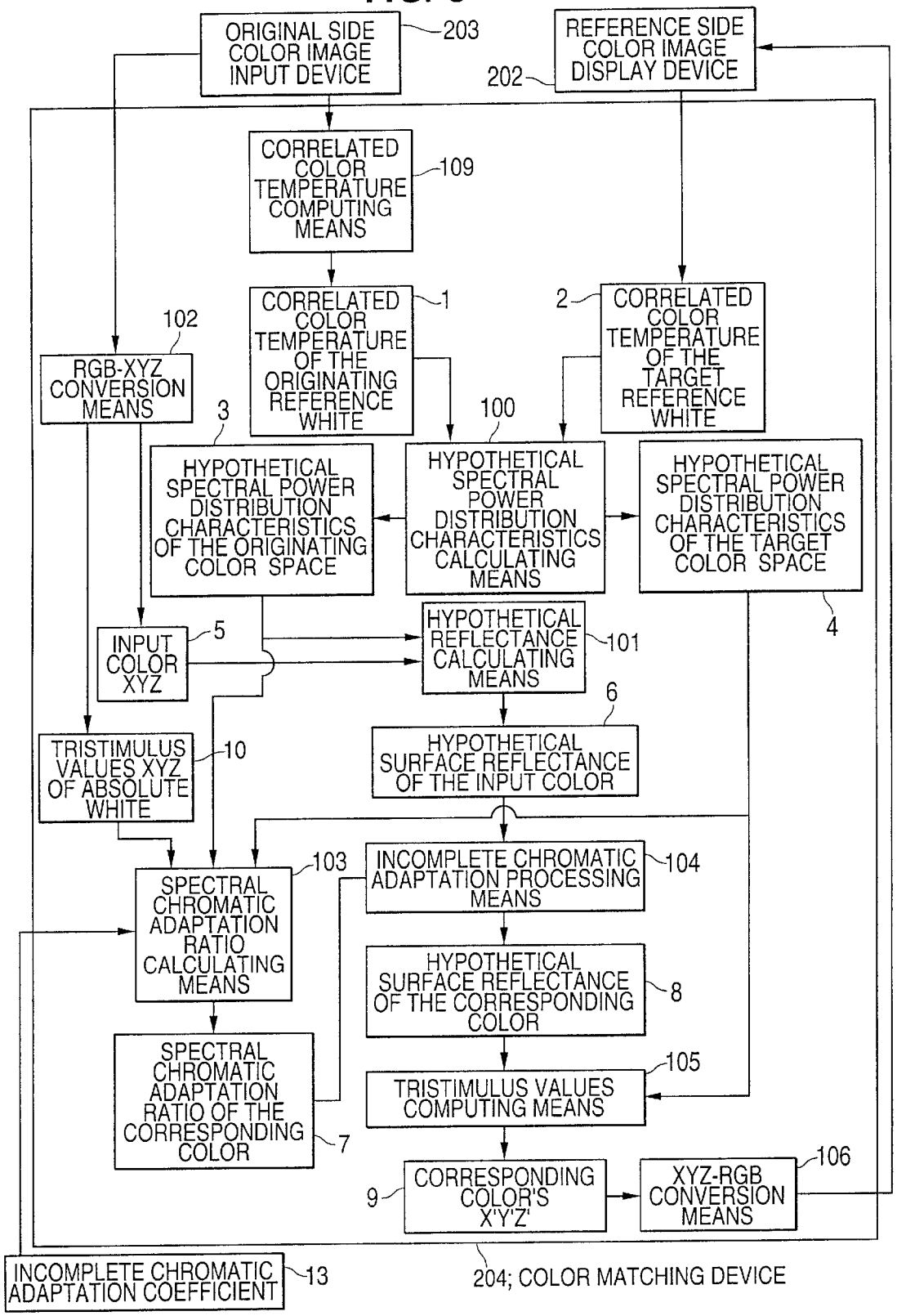
FIG. 3 is a block diagram showing the structure of a second embodiment of the color matching device according to the present invention.

FIG. 3 shows the block diagram showing the structure of a second embodiment of the color matching apparatus according to the present invention. In FIG. 3, the parts or components which are the same as those shown in FIG. 1 are denoted by the same reference numerals.

Referring to FIG. 3, a color image input device 203 on the original side and a color image display device 202 on the reference side are connected to a color matching device 204. The color image input device 203 on the original side is used for reading the color document to formulate color image data constituted by RGB values. Meanwhile, the color characteristics of the color image input device 203 on the original side and the color image display device 202 are assumed to be known from the outset.

Referring to FIG. 3, this color matching device 204 includes a correlated color temperature computing means 109, in addition to the structure provided in the color matching device 200 shown in FIG. 1. The correlated color temperature computing means 109 finds the correlated color temperature 1 of the originating reference white based on the chromaticity of the reference white of the color image input device 203 on the input side. As the method for computing the corresponding correlated color temperature from the chromaticity of the reference white used in the correlated color temperature computing means 109, the technique described in, for example, the Japanese patent application H-9-047334 (JP-A-10-229499) may, for example, be used.

The correlated color temperature 1 of the originating reference white, calculated by the correlated color temperature computing means 109, is input to the hypothetical spectral power distribution characteristics calculating means 100. The processing similar to that performed in the color matching device 200 shown in FIG. 1 then is carried out so that the optional input color captured by the color image input device 203 on the original side is converted into the color of the color image display device 202 of the reference side and output to the color image display device 202 on the reference side.

Figure 4:
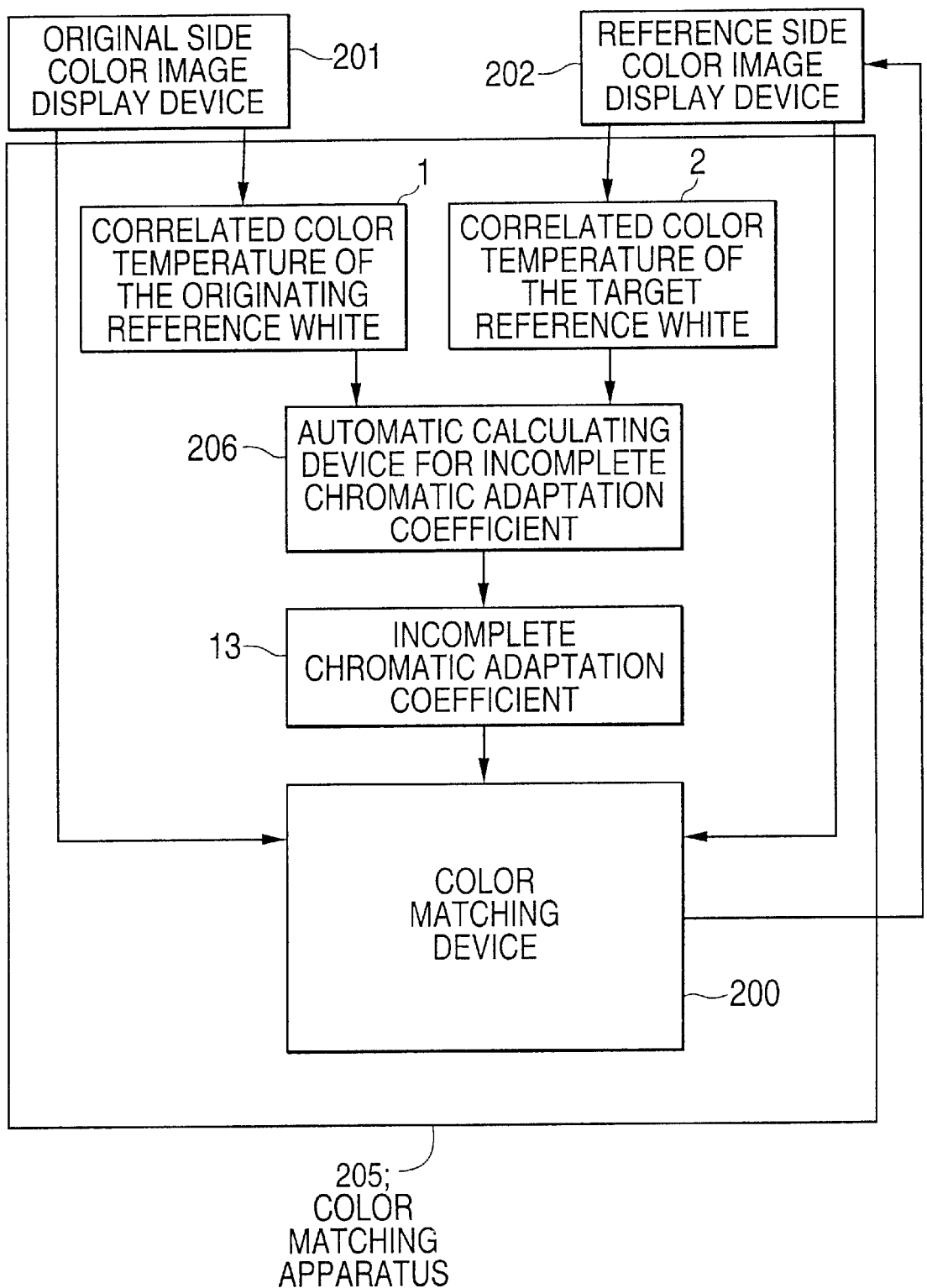
FIG. 4 is a block diagram showing the structure of a third embodiment of the color matching device according to the present invention.

FIG. 4 shows a block diagram showing the structure of a third embodiment of the color matching apparatus of the present invention. To a color matching apparatus 205, there are connected the color image display device 201 of the original side and the color image display device 202 of the reference side. The color characteristics of the respective color image display devices are assumed to be known from the outset. Referring to FIG. 4, this color matching apparatus 205 is made up of the color matching device 200 of the previous first embodiment and an automatic calculating device for incomplete chromatic adaptation coefficient 206.

The correlated color temperature 1 of the originating reference white and the correlated color temperature 2 of the target (object) reference white are obtained from the color characteristics of the color image display device. The correlated color temperature 1 of the originating reference white and the correlated color temperature 2 of the target reference white are input to the automatic calculating device for incomplete chromatic adaptation coefficient 206.

The automatic calculating device for incomplete chromatic adaptation coefficient 206 is explained.

Figure 5:
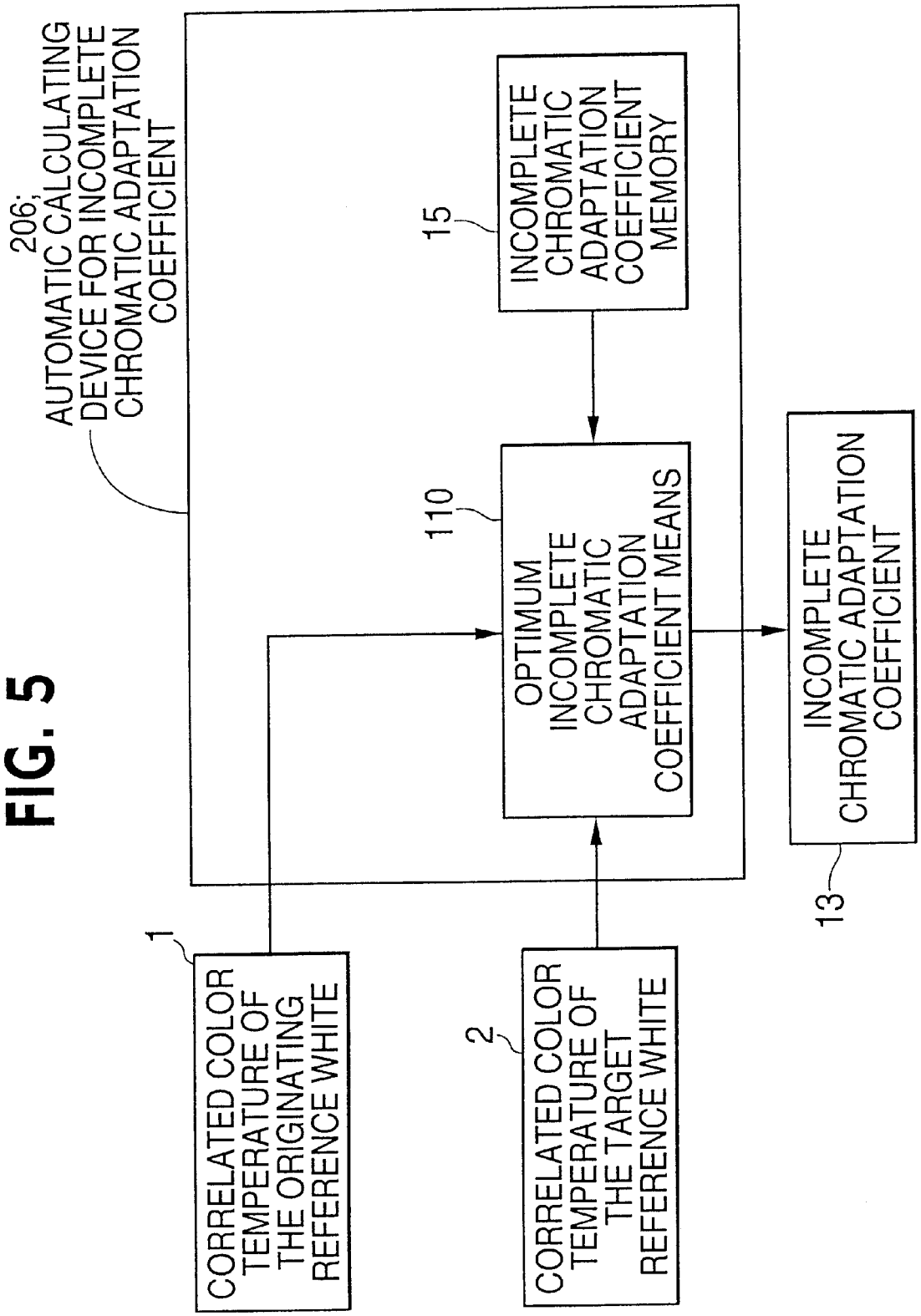
FIG. 5 is a block diagram showing an automatic calculating device for incomplete chromatic adaptation coefficient in the third embodiment of the present invention.

FIG. 5 shows a block diagram showing an illustrative structure of the automatic calculating device for incomplete chromatic adaptation coefficient 206. Referring to FIG. 5, the automatic calculating device for incomplete chromatic adaptation coefficient 206 includes an optimum incomplete chromatic adaptation coefficient calculating means 110 and an incomplete chromatic adaptation coefficient memory 15. The automatic calculating device for incomplete chromatic adaptation coefficient 206 calculates an incomplete chromatic adaptation coefficient 13 for coping with (or compensating for) a state in which the color perception of the viewer has adapted itself in completely between the reference white of the original side color image device and that of the reference side color image device.

First, an optimum incomplete chromatic adaptation coefficient adj is obtained for each of the various combinations of the correlated color temperatures, such as 9000 K–6500 K or 9000 K–5000 K, and is stored in the incomplete chromatic adaptation coefficient memory 15. The optimum incomplete chromatic adaptation coefficient calculating means 110 captures, from the combinations of the correlated color temperature 1 of the input original reference white and the correlated color temperature 2 of the target reference white, an incomplete chromatic adaptation coefficient corresponding to the input combination from the incomplete chromatic adaptation coefficient memory 15, and outputs an incomplete chromatic adaptation coefficient 13. This incomplete chromatic adaptation coefficient 13 is entered as an input to the color matching device 200.

The process of converting an optional color of the color image display device 201 of the original side to a color of the color image display device 202 of the reference side by the color matching device 200 is as explained in the first embodiment described previously.

The color image input device 203 may also be connected to the color image device on the original side in the color matching apparatus 205.

Figure 6:
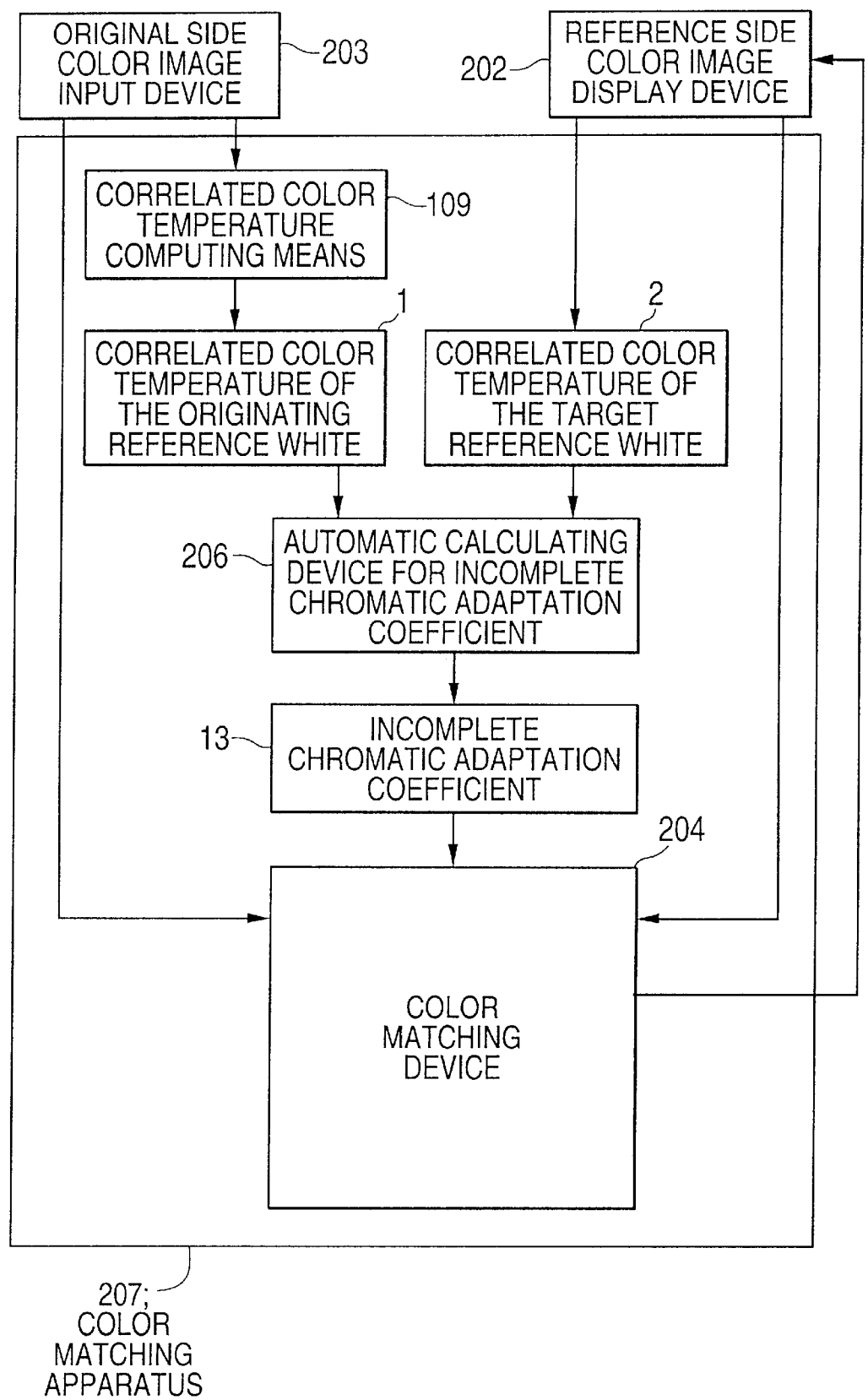
FIG. 6 is a block diagram showing the structure of a fourth embodiment of the color matching device according to the present invention.

FIG. 6 shows a block diagram showing a structure of a fourth embodiment of the color matching apparatus of the present invention. Referring to FIG. 6, the color matching apparatus 207 is realized by connecting a color image input device 203 as an original side color image device in the color matching apparatus 205, adding a correlated color temperature calculating means 109 for calculating the correlated color temperature 1 of the originating reference white, and by exchanging a color matching device 204 for the color matching device 200.

In the above-described embodiment, the color matching devices or apparatus 200, 205 and 206 have been explained for the cases in which a color image input device is used on the original side and a color image display device is used on the reference side. Alternatively, a color image recording device for reproducing the color by multi-colored inks, such as cyan, magenta, yellow and black inks, can be connected to the reference side color image device.

Figure 7:
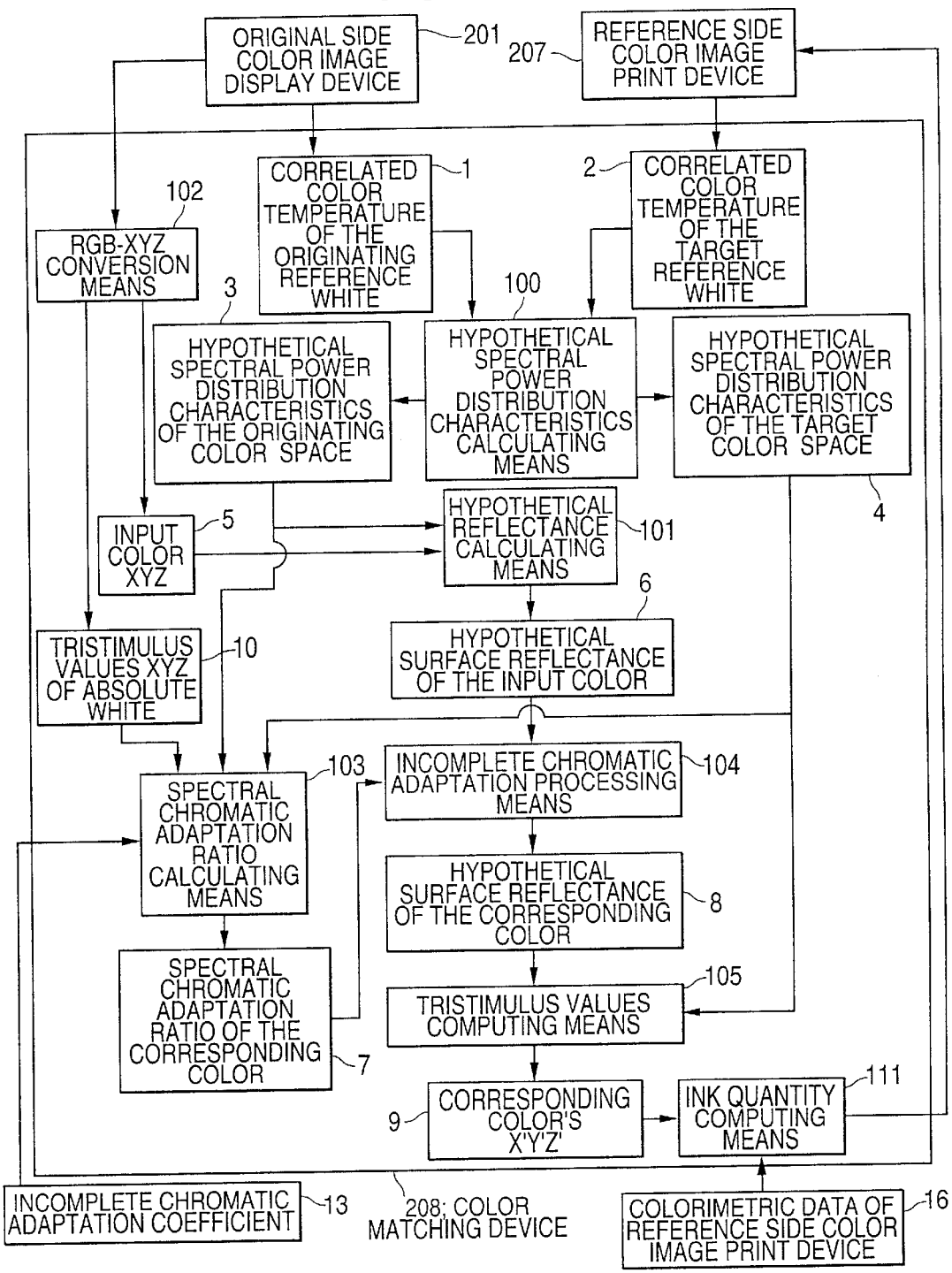
FIG. 7 is a block diagram showing the structure of a fifth embodiment of the color matching device according to the present invention.

FIG. 7 shows a block diagram showing a structure of a fifth embodiment of the color matching device of the present invention. In FIG. 7, parts or components which are the same as or similar to those shown in FIG. 1 are denoted by the same reference numerals.

Referring to FIG. 7, the original side color image display device 201 and the reference side color image print device 207 are connected to this color matching device 208. The reference side color image print device 207 is adapted to output a color image by multi-colored inks, such as cyan, magenta, yellow and black inks. It is assumed that color characteristics of the original side color image display device 201 and the reference side color image print device 207 are known from the outset, and colorimetric data 16 of the reference side color image print device, obtained on measuring the relation between the amount of the multi-colored ink and the tristimulus values, are given. The color matching device 208 is modified from the color matching device 200 shown in FIG. 1 in that an ink amount calculating means 111 is used in place of the XYZ-RGB conversion means 106.

Similarly to the color matching device 200 shown in FIG. 1, the color matching device 208 calculates the corresponding color's X', Y', Z' 9 in the reference side color image print device corresponding to the input color XYZ 5 from the original side color image display device 201.

If the corresponding color's X', Y', Z' 9 in the reference side color image print device 207 are calculated, the ink quantity calculating means 106 converts the corresponding color's X', Y', Z' 9 to the multi-color ink quantities to output the resulting ink quantities to the reference side color image print device 207. For converting tristimulus values XYZ to the multi-color ink quantities, the method described in (a) Japanese patent Application H-4-172246 (JP-A-6-22124) or (b) Japanese Patent Application H-6-79088 (JP-A-7-288706) may be used. However, other conversion methods may also be used. The entire disclosures of above (a), (b) are incorporated herein by reference thereto.

With the color matching device or apparatus 204, 205 or 207, shown in FIGS. 3, 4 and 6, in addition to the color matching device 200, it is possible to change the reproducing side color image display device 202 connected thereto to the reference side color image print device 207 by similar methods.

Figure 8:
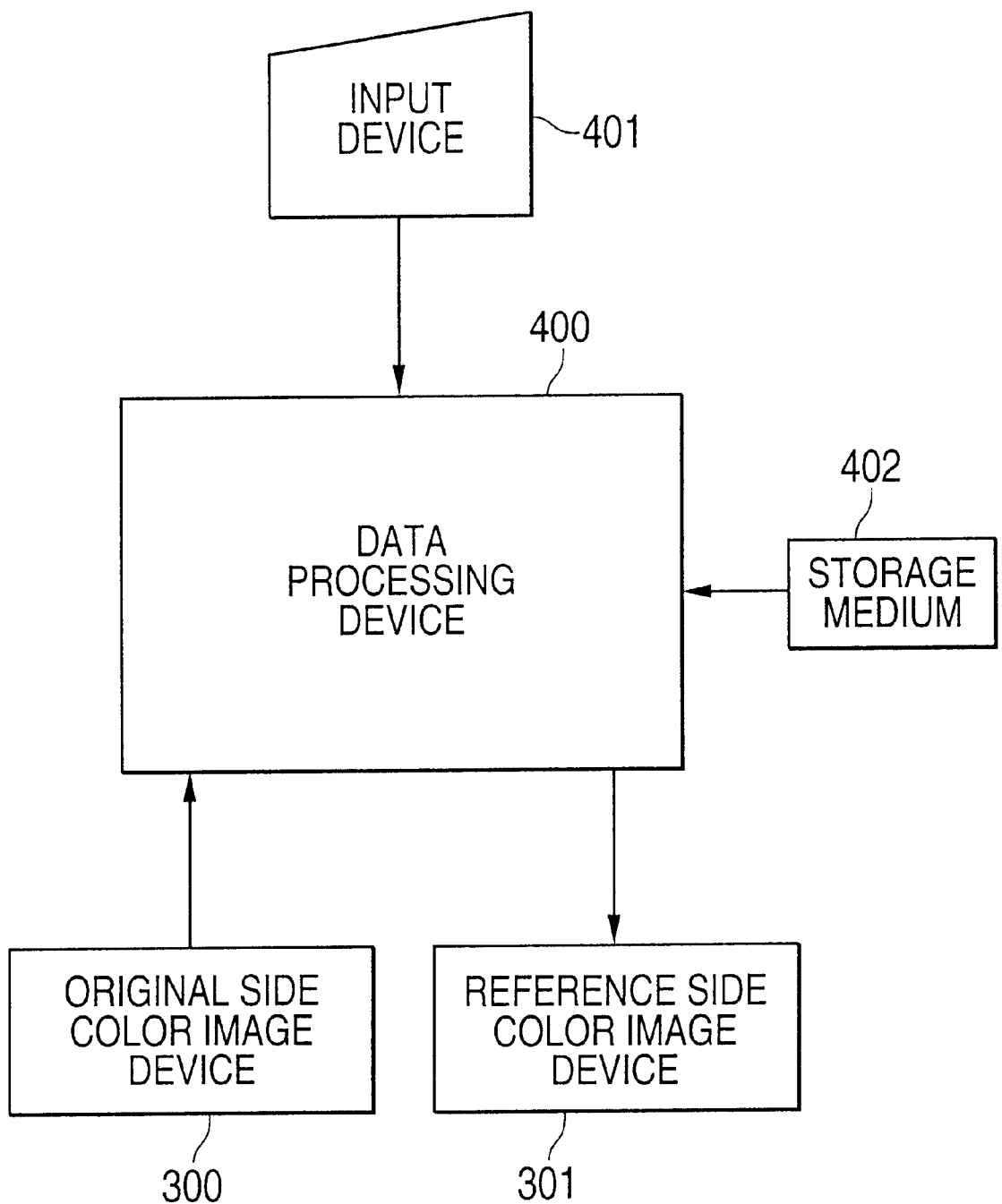
FIG. 8 is a block diagram showing an illustrative structure of the hardware configuration for realizing a color matching device according to the present invention.

FIG. 8 shows a block diagram showing an illustrative structure of the hardware configuration for realizing the embodiments shown in FIGS. 1, 3, 5, 6 and 7. Referring to FIG. 8, this hardware configuration is made up of a data processing device 400, including a storage (recording) medium 400, having the color matching program (program product) stored therein, an input device 401, an original side color image device 300 and a reproducing side color image device 301. The storage medium 402 may be a magnetic disc, a semiconductor memory or the like memories. The present inventions carried out by the data processing device 400 reading out the color matching program for realizing the method shown in FIG. 9 from the storage medium 402 and executing the read-out program. It is selfexplanatory that the storage medium 402 may be replaced by a communication network and the program product may be carried and/or supplied by a carrier medium such as a carrier wave having physical nature.

The meritorious effects of the present invention are summarized as follows.

According to the present invention, as described above, since color matching is effected in meeting with the incomplete chromatic adaptation state in the human visual system under the conditions of different reference whites, it is possible to match the color appearance of a color image between color image devices having different reference whites, such as scanners, monitors or printers.

Moreover, with the color matching method of the present invention, the color conversion can be realized at a high speed despite low computational cost and load.

It should be noted that other objects and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A color matching method for converting an optional color in an originating color space to a color in a target color space, keeping the color appearance, characterized by comprising the steps of:

(a) restoring spectral power distribution characteristics of an originating color space from a correlated color temperature of an originating reference white which is the reference white in the originating color space, and restoring spectral power distribution characteristics of a target color space from a correlated color temperature of a target reference white which is the reference white in said target color space;

(b) restoring, as a surface reflectance of the originating reference white, a first white surface reflectance from tristimulus values of the originating reference white, said spectral power distribution characteristics of the originating color space and human color matching functions, and also restoring a second white surface reflectance from tristimulus values of said originating reference white, spectral power distribution characteristics of said target color space and the human color matching functions;

(c) obtaining an adaptive white surface reflectance through interpolation of the first and second white surface reflectances;

(d) calculating a ratio of the first white surface reflectance to the adaptive white surface reflectance to obtain a spectral chromatic adaptation ratio;

(e) restoring a surface reflectance of said optional color in said originating color space by employing tristimulus values of said optional color, spectral power distribution characteristics of said originating color space and the human color matching functions;

(f) multiplying said surface reflectance of the optional color with said spectral chromatic adaptation ratio to obtain an adaptive surface reflectance of said optional color; and (g) finding tristimulus values of the color in said target color space from the adaptive surface reflectance of said optional color, the spectral power distribution characteristics of said target color space and the human color matching functions.

2. The color matching method as defined in claim 1 wherein in said step (c) of obtaining adaptation white surface reflectance through interpolation of said first and second white surface reflectances, an incomplete chromatic adaptation coefficient is changed responsive to the state of incomplete chromatic adaptation in the human visual system, the degree of interpolation of said first and second white surface reflectances is freely changed to obtain said adaptation white surface reflectance.

3. The color matching method as defined in claim 2, further comprising the step of: calculating an optimum incomplete chromatic adaptation coefficient from combination of the reference white of said originating color space and the reference white of said target color space, said incomplete chromatic adaptation coefficient obtained from said optimum incomplete chromatic adaptation coefficient calculating step being used.

4. A color matching apparatus for converting an optional color in an originating color image device to a color in a target color image device, keeping the color appearance, characterized by comprising:

(a) means for restoring spectral power distribution characteristics of an originating color space from a correlated color temperature of an originating reference white which is the reference white of said originating color image device, and restoring spectral power distribution characteristics of the target color space from a correlated color temperature of a target reference white which is the reference white of said target color image device;

(b) means for restoring, as a surface reflectance of said originating reference white, a first white surface reflectance from tristimulus values of the originating reference white, said spectral power distribution characteristics of said originating color space and human color matching functions, and also restoring a second white surface reflectance from tristimulus values of said originating reference white, spectral power distribution characteristics of said target color space and human color matching functions;

(c) means for obtaining an adaptive white surface reflectance through interpolation of the first and second white surface reflectances;

(d) means for calculating a ratio of the first white surface reflectance to the adaptive white surface reflectance to obtain a spectral chromatic adaptation ratio;

(e) means for restoring a surface reflectance of said optional color in said originating color image device by employing tristimulus values of said optional color, spectral power distribution characteristics of said originating color space and the human color matching functions;

(f) means for multiplying said surface reflectance of the optional color with said spectral chromatic adaptation ratio to obtain an adaptive surface reflectance of said optional color;

(g) means for finding tristimulus values of the color in said target color image device from the adaptive surface reflectance of said optional color, the spectral power distribution characteristics of said target color space and the human color matching functions, and

19

(h) means for converting the tristimulus values of the color in said target color image device into device color data of said target color image device.

5. The color matching apparatus as defined in claim 4 wherein in said means for obtaining adaptive white surface reflectance through interpolation of the first and second white surface reflectances, an incomplete chromatic adaptation coefficient is changed responsive to the state of incomplete chromatic adaptation in the human visual system, the degree of interpolation of said first and second white surface reflectances is freely changed to obtain said adaptive white surface reflectance.

6. The color matching apparatus as defined in claim 5, further comprising:

means for calculating an optimum incomplete chromatic adaptation coefficient from combination of the reference white of said originating color image device and the reference white of said target color image device, said incomplete chromatic adaptation coefficient obtained from said optimum incomplete chromatic adaptation coefficient calculating means being used.

7. The color matching apparatus as defined in claim 4 wherein a color image display device is provided in the originating image device and a color image display device is provided in the target color image device.

8. The color matching apparatus as defined in claim 4 wherein a color image display device is provided in the originating image device and a color image print device is provided in the target color image device for color reproduction with multiple color inks;

there being provided means for calculating ink quantity calculating as means for converting the tristimulus values of the color in said target color image device.

9. The color matching apparatus as defined in claim 4 wherein there is provided a color image input device in the originating color image device by providing means for calculating the correlated color temperature of the reference white from chromaticity of the reference white of the color image device.

10. A machine-readable program product performing, on a computer, the following program steps comprising:

(a) restoring spectral power distribution characteristics of an originating color space from a correlated color temperature of an originating reference white which is the reference white of an originating color image device, and restoring spectral power distribution characteristics of a target color space from a correlated color temperature of a target reference white which is the reference white of a target color image device;

(b) restoring, as a surface reflectance of said reference white, a first white surface reflectance from tristimulus values of the reference white, said spectral power distribution characteristics of said originating color space and human color matching functions, and also restoring a second white surface reflectance from tristimulus values of said originating reference white, spectral power distribution characteristics of said target color space and human color matching functions;

(c) obtaining an adaptive white surface reflectance through interpolation of the first and second white surface reflectances;

(d) calculating a ratio of the first white surface reflectance to the adaptive white surface reflectance to obtain a spectral chromatic adaptation ratio;

20

(e) restoring a surface reflectance of said optional color in said originating color image device by employing said tristimulus values of said optional color, spectral power distribution characteristics of said originating color space and the human color matching functions;

(f) multiplying said surface reflectance of the optional color with said spectral chromatic adaptation ratio to obtain an adaptive surface reflectance of said optional color;

(g) finding tristimulus values of the color in said target color image device from the adaptive surface reflectance of said optional color, the spectral power distribution characteristics of said target color space and the human color matching functions; and (h) converting the tristimulus values of the color in said target color image device into device color data of said target color image device.

11. A machine-readable medium having said program product as defined in claim 10.

12. A machine-readable program product performing, on a computer, (a) computing correlated color temperature of a reference white from chromaticity of a reference white of a color image device;

(b) restoring spectral power distribution characteristics of an originating color space from a correlated color temperature of an originating reference white which is the reference white of an originating color image device, and restoring spectral power distribution characteristics of a target color space from a correlated color temperature of a target reference white which is the reference white of a target color image device;

(c) restoring, as a surface reflectance of said reference white, a first white surface reflectance from tristimulus values of the reference white, said spectral power distribution characteristics of said originating color space and human color matching functions, and also restoring a second white surface reflectance from tristimulus values of said originating reference white, spectral power distribution characteristics of said target color space and human color matching functions;

(d) obtaining an adaptive white surface reflectance through interpolation of the first and second white surface reflectances;

(e) calculating a ratio of the first white surface reflectance to the adaptive white surface reflectance to obtain a spectral chromatic adaptation ratio;

(f) restoring a surface reflectance of said optional color in said originating color image device by employing said tristimulus values of said optional color, spectral power distribution characteristics of said originating color space and the human color matching functions;

(g) multiplying said surface reflectance of the optional color with said spectral chromatic adaptation ratio to obtain an adaptive surface reflectance of said optional color;

(h) finding tristimulus values of the color in said target color image device from the adaptive surface reflectance of said optional color, the spectral power distribution characteristics of said target color image device and the human color matching functions; and (i) converting tristimulus values of the color in said target color image device into device color data of said target color image device.

13. A machine-readable medium having said program product as defined in claim 12.

14. The color matching apparatus as defined in claim 6, wherein a color image display device is provided in the originating image device and a color image display device is provided in the target color image device.

15. The color matching apparatus as defined in claim 6, wherein a color image display device is provided in the originating image device and a color image print device is provided in the target color image device for color reproduction with multiple color inks;

there being provided means for calculating ink quantity calculating as means for converting the tristimulus values of the color in said target color image device.

16. The color matching apparatus as defined in claim 8, wherein there is provided a color image input device in the originating color image device by providing means for calculating the correlated color temperature of the reference white from chromaticity of the reference white of the color image device.

17. The color matching method as defined in claim 1, wherein the step d) is performed in accordance with the following equation:

$$Rwv_{ad}(\lambda)=adj \times Rwv(\lambda)+(1-adj) \times Rwv'(\lambda),$$

wherein $Rwv_{ad}(\lambda)$ corresponds to the adaptive white surface reflectance, $Rwv(\lambda)$ correspond to the first white surface reflectance, $Rwv'(\lambda)$ corresponds to the second white surface reflectance, and adj is an incomplete chromatic adaptation coefficient that is a real value between 0 and 1, inclusive.

18. The color matching apparatus as defined in claim 4, wherein the means for obtaining an adaptive white surface reflectance performs a calculation in accordance with the following equation:

$$Rwv_{ad}(\lambda)=adj \times Rwv(\lambda)+(1-adj) \times Rwv'(\lambda),$$

wherein $Rwv_{ad}(\lambda)$ corresponds to the adaptive white surface reflectance, $Rwv(\lambda)$ correspond to the first white surface reflectance, $Rwv'(\lambda)$ corresponds to the second white surface reflectance, and adj is an incomplete chromatic adaptation coefficient that is a real value between 0 and 1, inclusive.

19. The machine-readable program product as defined in claim 10, wherein the program step d) is performed in accordance with the following equation:

$$Rwv_{ad}(\lambda)=adj \times Rwv(\lambda)+(1-adj) \times Rwv'(\lambda),$$

wherein $Rwv_{ad}(\lambda)$ corresponds to the adaptive white surface reflectance, $Rwv(\lambda)$ correspond to the first white surface reflectance, $Rwv'(\lambda)$ corresponds to the second white surface reflectance, and adj is an incomplete chromatic adaptation coefficient that is a real value between 0 and 1, inclusive.

20. The machine-readable program product as defined in claim 12, wherein the program step d) is performed in accordance with the following equation:

$$Rwv_{ad}(\lambda)=adj \times Rwv(\lambda)+(1-adj) \times Rwv'(\lambda),$$

wherein $Rwv_{ad}(\lambda)$ corresponds to the adaptive white surface reflectance, $Rwv(\lambda)$ correspond to the first white surface reflectance, $Rwv'(\lambda)$ corresponds to the second white surface reflectance, and adj is an incomplete chromatic adaptation coefficient that is a real value between 0 and 1, inclusive.

* * * * *